United States Patent
Mezrich

[11] 3,767,285
[45] Oct. 23, 1973

[54] ENHANCED READOUT OF STORED HOLOGRAMS

[75] Inventor: Reuben Saul Mezrich, Rocky Hill, N.J.

[73] Assignee: RCA Corporation, New York, N.Y.

[22] Filed: July 28, 1972

[21] Appl. No.: 275,930

[52] U.S. Cl. ............................ 350/3.5, 340/173 LT
[51] Int. Cl. ........................................... G02b 27/00
[58] Field of Search ................ 350/3.5; 250/219 D, 250/199; 340/173 LT, 173 LM, 173 LS

[56] References Cited
UNITED STATES PATENTS

| | | |
|---|---|---|
| 3,698,010 | 10/1972 | Lee ...................................... 350/3.5 |
| 3,572,936 | 3/1971 | Johnson et al. ....................... 350/3.5 |
| 3,542,452 | 11/1970 | Gerritsen et al. ..................... 350/3.5 |
| 3,541,252 | 11/1970 | Collier et al. ........................ 350/3.5 |

Primary Examiner—Ronald J. Stern
Attorney—H. Christoffersen, Irwin M. Krittman, Samuel Cohen and Glenn H. Bruestle

[57] ABSTRACT

Virtual image readout of relatively high intensity is obtained by employing two readout beams, one following the path of the reference beam and the other following the path of the object beam, and modulating at least one of the beams. Amplitude, intensity or phase modulation may be employed.

6 Claims, 7 Drawing Figures

ENHANCED READOUT OF STORED HOLOGRAMS

STATEMENT

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

The signal obtained when reading out a stored hologram is a relatively low level signal. Its intensity may be as low as a fraction of a percent and generally is not greater than several percent of the readout bean intensity. The present application deals with the problem of enhancing this signal.

SUMMARY OF THE INVENTION

A hologram is read out by two beams, one following the path of the object beam and the other following the path of the reference beam. At least one of the beams is modulated.

DETAILED DESCRIPTION

Figure 1:
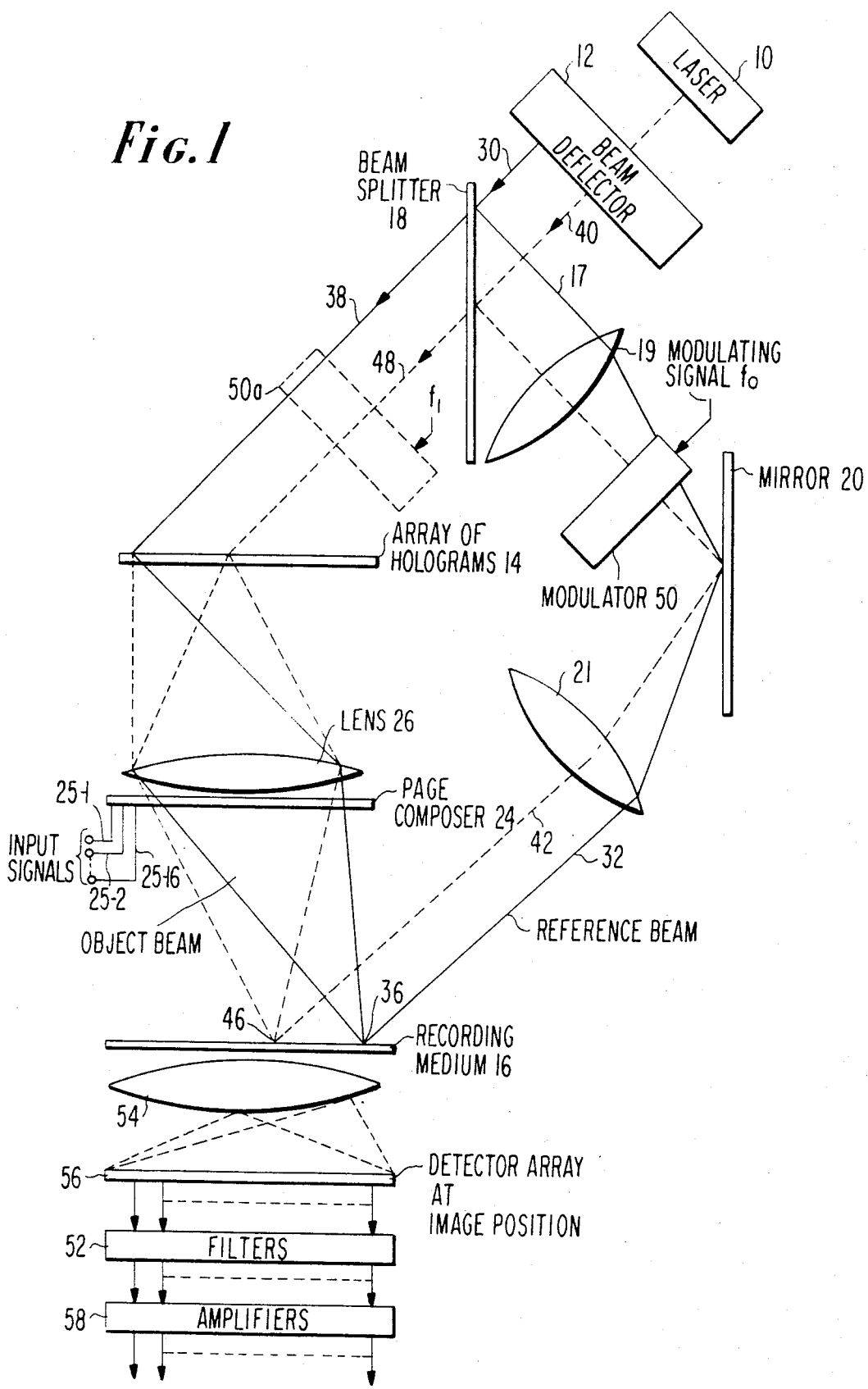
FIG. 1 is a schematic showing of a system according to one embodiment of the present invention.

The system shown in FIG. 1 resembles a hologram memory system described in U.S. Pat. No. 3,628,847, Hologram Memory, issued Dec. 21, 1971, to D. I. Bostwick and assigned to the same assignee as the present application. The present system differs from that system by including a modulator 50 and filters 52 and certain other components but differs mainly in the way the stored holograms are read out. To better orient the reader, the known system will be described first and the reader should imagine for purposes of this first part of the discussion that the modulator 50 and filters 52 are absent.

The known system includes a source of coherent light such as laser 10 and a light beam deflector 12. The latter may be electromechanical or electronic in nature and its purpose is to deflect the laser beam to any one of $N^2$ positions, where $N^2$ represents the number of holograms in the array 14 and represents also the number of storage locations on the recording medium 16.

The deflected light beam produced by deflector 12 is applied to a beam splitter 18. One portion 17 of the light is reflected from the beam splitter and mirror 20 onto one location on the recording medium 16. The lenses 19 and 21 are employed to make the beam 17 undergo the same number or refractions and reflections as the other portion 38 of the light beam. The other portions 38 of the light beam passes through the beam splitter 18 and onto the array of holograms 14.

Figure 3:
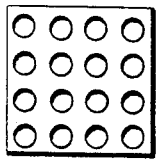
FIG. 3 illustrates the reconstructed image of a plurality of light sources stored as one of the holograms in the array shown in FIG. 1.

Each hologram in the array 14 represents a plurality of light sources equal in number to the number of bits present in the page composer 24. For purposes of the present discussion, each hologram in the array 14 is illustrated in FIG. 3 to represent 16 light sources and the page composer 24 is also illustrated to contain 16 bits. In practice, of course $B^2$—the number of bits per page, is much larger than 16.

The spacing between the array of holograms 14 and the page composer 24 (twice the focal length of lens 26) is such that the reconstructed image of the hologram illuminated falls onto the page composer 24. Referring a moment to FIG. 3, the reconstructed light sources may appear as 16 sources of coherent light arranged in an array, as shown. The page composer 24 may be an electronically or electrically controlled light shutter means, the storage locations of which may be made relatively transparent (shown in white) or relatively opaque (shown in black) in accordance with the binary data it is desired to write into the memory. The data is supplied to the 16 locations via 16 electrical signal leads 25-1 to 25-16. Each light source superimposes over an opaque or a transparent area of the page.

The lens 26 causes the light passing through the page composer 24 to focus onto a very small area on the recording medium in a position dependent upon the amount and direction the light beam is deflected by the beam deflector 12. Put another way, the position on the recording medium onto which the light is focused by lens 26 is a function of the particular hologram selected from the array 14. The optics of the system is such that the beam from mirror 20 is also directed at the same location on the recording medium. The result is the creation at the recording medium of an interference pattern which is recorded there as a hologram.

The recording medium 16 may be a photographic film for a permanent, that is, a read-only memory. Alternatively, the recording medium may be a photochromic, magnetic, low melting point glass, ferroelectric or other form of erasable material.

Figure 2:
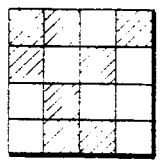
FIG. 2 illustrates schematically a page composer 24 which may be used in the system of FIG. 1.

In the operation of the system of FIG. 1, a particular bit pattern, such as shown in FIG. 2, initially may be set up in the page composer 24. At this time, the beam deflector may deflect the laser beam to the position indicated by solid line 30. The reference beam 32 which results falls on one location, 36, of the memory recording medium 16. The object beam 38 passes through the beam splitter 18 and one hologram in the array of holograms 14. This causes to be reconstructed at the page location the image of an array of coherent light sources such as shown in FIG. 3, each light source illuminating one bit of information (one opaque or transparent square) of the page. The lens 26 causes this light to converge onto the same location 36 as the reference beam 32. The result is the formation of a hologram in a very small area, perhaps one twenty fifth of an inch by one twenty fifth of an inch on the recording medium.

When it is desired to record a second page of information, the input signal pattern on leads 25 to the page composer 24 is changed to represent the bits on the second page. A new pattern of opaque and transparent areas result. The beam deflector is now adjusted to deflect the laser beam to another location on the array of holograms 14 and another location o the recording medium 16. For example, the laser beam may be deflected as indicated by dashed line 40. The reference beam 42 now strikes the recording medium at location 46. The object beam 48 now passes through another hologram in the array 14. This other hologram contains the same information as the remaining holograms in the array 14, that is, each hologram is identical and represents the same array of 16 light sources. The optics is such that regardless of the location of the hologram selected from array 14, its image appears at the same place—at the position of the page 24. However, the lens 26 directs this light to a new location, namely location 46 on the recording medium. Therefore, at location 46 a second hologram is recorded, this one of the page $M + 1$.

During the write operation described above, the recording medium, in the case of a photographic film, initially is unexposed. The write operation for each location may require, in the case of a photographic film, of the order of seconds or less of exposure time and in the case of certain magnetic materials such as manganese bismuth, of the order of microseconds or less. In the case of photographic film, after all memory locations have been written, the film is processed, developed and fixed.

The readout of the stored information is not described in the Bostwick patent because it is conventional. It will be discussed here so that the important improvement obtained by virtue of the readout means of the present invention will be appreciated.

In a system such as shown in FIG. 1 when it is desired to read out a hologram, the object beam is blocked. This may be accomplished by making the page composer entirely opaque or by placing a shutter in the path of the object beam—between beam splitter 18 and array 14, for example. The reference beam, however, is deflected by the beam deflector 12 and is caused to pass through the path including the lens 19, the mirror 20 and the lens 21 to the recording medium surface. (Consider, for the present, the modulator 50 to be removed or made inactive.) The reference beam illuminates one of the holograms recorded on the recording medium and the lens 54 causes the virtual image of the selected hologram to be reconstructed at the virtual image position. An array of light detectors 56 is located at this virtual image position, there being one light detector for each bit. In the present example, there are 16 light detectors positioned to receive the signals from the 16 bit locations, respectively, of the virtual image.

Each light detector now produces an electrical signal indicative of the bit in the hologram corresponding to that detector. For example, in the case of a bit represented by a black region (a zero) the detector will receive light at low intensity, if at all, and will produce an output electrical signal at low level of amplitude representing a 0. If the detector receives a signal from a transparent area, representing a 1 stored in the hologram, the detector will produce a signal of relatively high amplitude representing a 1. The 16 signals produced by the detector array are applied directly to 16 amplifiers 58 (filters 52 are not needed).

It is also known to employ a modulator such as a "light chopper" in the path of the reference beam during readout. The effect is to produce intensity modulated signals (alternating signals) rather than direct current signals at the detector 56. While no signal "enhancement" (this term is discussed later) results, improvement in signal-to-noise ratio can be obtained by using properly tuned filters at 52 at the input circuits to the amplifiers 58. In this known mode of operation, as in the previous one described, only the reference beam is used during read out—the object beam is blocked by, for example, making the page composer opaque.

The system of the present invention also includes a modulator 50 (one of a number of different types, discussed later, may be employed). It may be located either in the path of the object beam or in the path of the reference beam. In the present example, it is shown in the path of the reference beam. on In operation of the present system, during readout the modulator is turned on and the page composer, rather than being closed, is completely open. The result is that during readout, both a modulated reference beam and a second beam which follows the path of the object beam reach the selected location on the recording medium. Operation in this way gives output signals of greatly increased intensity as will be shown in the discussion which follows.

Returning now to the conventional way in which a hologram is formed and subsequently read out, the hologram formation occurs by the interference of an object wave with the reference wave. In the usual case, the intensities of the two waves are unequal and the relationship between them is:

$$I_R = k I_o \tag{1}$$

where: $I_R$ = intensity of reference wave, $I_o$ = intensity of object wave, $k$ = a constant (usually greater than 1).

In the conventional method of reading out a hologram after it is formed (and if necessary developed), it is illuminated solely by the reference wave (the object wave is blocked) and a virtual image is produced. This virtual image wave contains the information recorded in the hologram. The intensity of the virtual image wave (the signal) is proportional to the intensity of the reference wave employed for readout and is given by:

$$I_S = n I_R \tag{2}$$

where: $n$ is the holographic efficiency and is usually considerably less than 1.

As already mentioned, it was known prior to the present invention to employ a modulator during readout, using only the modulated reference wave. The detected signal intensity $I_S$ obtained when employing a reference beam sinusoidally amplitude modulated at a frequency $f_o$ is:

$$I_S = n I_R \cos^2 x \tag{3}$$

where: $x = wt = 2\pi f_o t$ Using the geometric identity $\cos^2\theta = \frac{1}{2} + \frac{1}{2}\cos 2\theta$, equation 3 becomes:

$$I_S = n I_R (1 + \cos 2x)/2 \tag{4}$$

It is seen from equation 4 that the output signal frequency (corresponding to the angular frequency $2x = 4\pi f_o t = 2wt$) is twice that of the modulating signal $f_o$. This signal may be recovered by electronic filters 52 tuned to frequency $2f_o$.

In the present invention, both the reference beam and a second beam which follows the same path as the object beam are employed during readout. The reference beam is modulated at a frequency $f_o$. The object beam may be left on by opening all locations of the page composer 24 so that the page composer appears to be transparent. The amplitude $A_S$ of the readout signal (the signal sensed by the detector) when operated in this way is:

$$A_S = (I_S)^{1/2} + (I_o)^{1/2} \tag{5}$$

Substituting equations 3 and 1 into 5 gives:

$$A_S = [nI_R \cos^2 x]^{1/2} + [I_R/k]^{1/2} \tag{6}$$

The intensity $I_S$ of the detected signal is:

$$I_S = A_S A_S^* = A_S^2 \tag{7}$$

where: $A_S^*$ is the conjugate of $A_S$.

Substituting equation 6 into equation 7 gives:

$$I_S = nI_R \cos^2 x + (I_R/k) + 2I_R [n/k]^{1/2} \cos x \tag{8}$$

Substituting equation 4 for the first term gives:

$$I_S = nI_R (1+\cos 2x)/2 + (I_R/k) + 2I_R [n/k]^{1/2} \cos x \tag{9}$$

The first term in equation 9 is the signal that would be detected if the object wave were blocked during readout. It is the same term that appears in equation 4. Note that the frequency involved is twice that associated with the modulating signal $f_o$. In the present readout method, this signal is filtered out by the filters 52 of FIG. 1 which in this instance are band-pass filters. This signal is not of great interest because its intensity is so much lower than that of the third term in the equation, as discussed shortly.

The second term in equation 9 is the DC component of the beam above. It carries no useful information and, since it is at DC, it also is filtered out by the filters (52) of FIG. 1.

The third term in equation 9 is the "enhanced" signal which is the one of interest in the present application. It is this signal, which is at the same frequency as the amplitude modulating signal, to which the band pass filters 52 are tuned. The ratio of the intensity of this signal $I_{S2}$ to the intensity $I_{S1}$ of the detected signal obtained using a modulated reference beam and no object beam is:

$$I_{S2}/I_{S1} = (2I_R [n/k]^{1/2}/nI_R/2) = (4/[nk]^{1/2}) \tag{10}$$

With typical values of $n = 10^{-2}$ and $k = 4$ the theoretical signal enhancement which is possible is 20 times. This is a very significant improvement in performance.

If desired, rather than discarding the signal represented by the first term of equation 9, it may instead be recovered and added to the signal represented by the third term of FIG. 9. The added circuit needed is a high pass filter or band-pass filter tuned to frequency $2f_o$. The amount of improvement in total signal strength which will result is about 10 percent in the example above.

Figure 4:
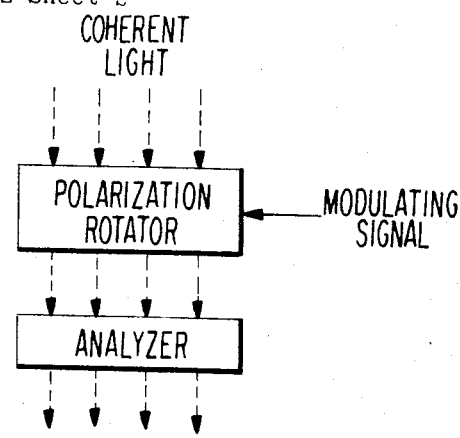
FIGS. 4–7 show various forms of modulators which may be used in a system according to the present invention.

Amplitude modulation may be achieved in the manner shown in FIG. 4. The coherent light passes through a polarization rotator 60 the function of which is to produce a rotating linearly polarized wave. There are a number of different devices which may be employed as the element 60. For example, a Faraday cell may be employed. As a second example, a rotating ½ wave plate may be used to create the rotating plate polarized wave.

The output wave produced by the rotator 60 is applied to an analyzer 62. The latter consists of a polarizer which remains in fixed position. Accordingly, the analyzer causes an output wave to be produced which varies in amplitude in accordance with the direction of plane polarization of the input wave.

Figure 6:
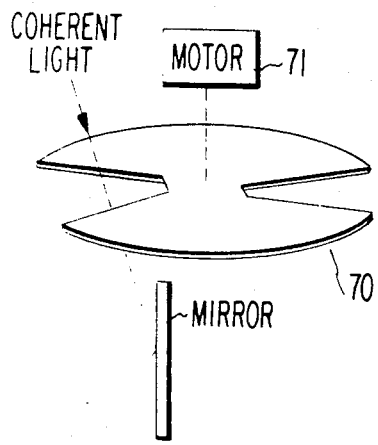

Modulation of the reference wave also can be accomplished in another way as shown in FIG. 6. Here, a mechanical shutter 70 consisting of a disk with one or more openings therein may be placed in the path of the reference beam during readout. In the particular embodiment illustrated, the disk is formed with two cut-out sections and is continuously rotated by motor 71. The modulation obtained in this way is termed "intensity" modulation for purposes of the present application. With a modulator of this kind, the amplitude of the reference wave is:

$$I_R p(t) \tag{11}$$

where: $p(t)$ represents the Fourier series expansion of a square wave.

Using both an intensity modulated reference beam obtained as shown in FIG. 6 and a second beam following the path of the object beam, the amplitude of the detected signal obtained during readout is:

$$A_S = (nI_R)^{1/2} p(t) + [I_R/k]^{1/2} \tag{12}$$

and the intensity $I_S$ of the detected signal is:

$$I_S = A_S^2 = nI_R p(t) + I_R/k + 2I_r [n/k]^{1/2} p(t) \tag{13}$$

In equation 13, the first term is the component due to the beam following the path of the object beam (the reconstructed object wave), the second term represents the image of the original object, and the third term represents the enhanced signal. Note that here the enhanced signal has the same frequency components as the signal of the first term so that the signals represented by the first and third terms both will pass through the filters 52. It also might be mentioned that in the first term, the expression $p(t)$ has the same value as $[p(t)]^2$ (because the limits of the square wave (the wave produced by the rotating shutter) arbitrarily are considered to be 1 and 0) and it is for this reason that the square sign is omitted from this term.

With a signal such as described by equation 13 above, the detector array 56 of FIG. 1 may be followed by high pass filters 52 for detecting all of the components, including harmonics, of the enhanced signal or the filters 52 may, as before, be band-pass filters tuned to one component of the enhanced signal. Using this last case as an example, the intensity $I_S$ of the detected signal at the modulating signal frequency $f_o$ is:

$$I_S = [n + 2(n/k)^{1/2}](2/\pi) I_R \cos 2x \tag{14}$$

The enhancement achieved assuming values of $n = 10^{-2}$ and $k = 4$ over the case where modulation is used and the object beam is blocked is:

$$\frac{I_{S2}}{I_{S1}} = \frac{\left[n + 2\left(\frac{n}{k}\right)^{1/2}\right] 2/\pi}{n \cdot \frac{2}{\pi}} = 1 + 10 = 11 \tag{15}$$

Note that here the enhancement obtained is not as great as with the amplitude modulation arrangement represented by FIG. 4 but nevertheless still is significant.

Figure 5:
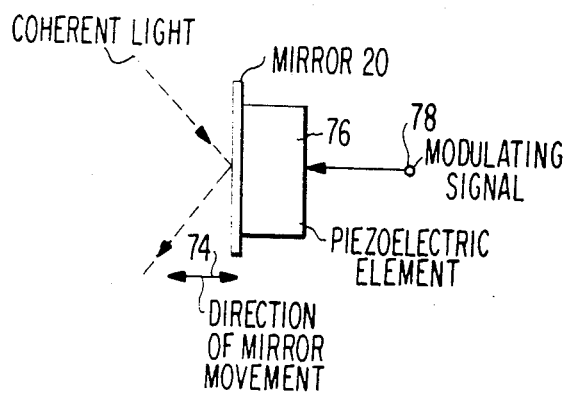

A final way in which the reference wave may be modulated when practicing the present invention is phase modulation. One phase modulation arrangement is shown in FIG. 5. It includes a physically vibrating element secured to the mirror 20 for moving the mirror in the direction indicated by arrows 74. The effect of this movement is to change the length of the path traveled by the reference wave through a small distance such as a fraction of a micron (one micron = $10^{-6}$ meter). A particularly convenient means for achieving this movement is a piezo electric crystal such as 76 which is caused physically to oscillate in response to an electrical modulating signal applied to input terminal 78. There are a number of other alternatives which are possible. For example, the mirror may be secured to a magnetic bar located within a coil and which is caused physically to oscillate in response to an alternating signal applied to the coil.

Figure 7:
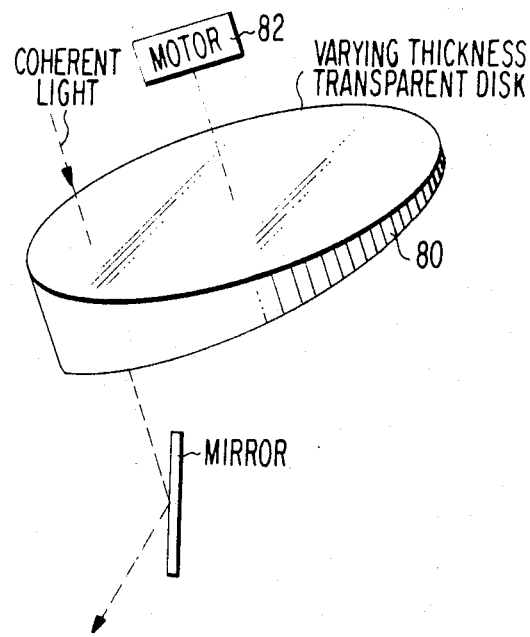

A second form of phase modulation arrangement is illustrated in FIG. 7. It includes a transparent disk 80 which is located in the path of a reference beam and which is continuously rotated by motor 82. The thickness of the disk varies so that the length of the path through the disk taken by the reference beam also varies. The result is a variation in the path length taken by the reference beam at a frequency proportional to the motor speed.

With a phase modulator as shown in FIGS. 5 and 7, the amplitude $A_S$ of the detected signal using two beams for readout, one of the modulated reference beam and the other a beam following the object beam path, is:

$$A_S = (nI_R)^{1/2} e^{j\phi_0 \cos x} + (I_R/k)^{1/2} \tag{16}$$

where: $j = \sqrt{-1}$

The intensity $I_S$ of the signal which is produced when both the object beam and the phase modulated reference beam are employed to read out a stored hologram is:

$$I_S = A^2 = nI_R + (I_R/k) + 2I_R [n/k]^{1/2} \cos(\cos 2x) \tag{17}$$

In this case either a high pass filter for all frequencies above $f_o$ may be used to detect the enhanced signal.

In the case of a phase modulated reference beam, a direct comparison between the signal intensity using the reference beam alone and the signal intensity using the reference plus a second beam following the path of the object beam for read out, is not meaningful. The reason is that using a phase modulated reference beam alone for read out does not produce anything significantly different than an unmodulated reference beam. However, the present method may be compared with using only a reference beam for readout with the reference beam amplitude modulated. It can be shown that the enhancement obtained during readout using a phase modulated reference beam and a second beam following the path of the object beam over using only an amplitude modulated reference beam, is a factor of 20, just as in the first case discussed.

In a system which has been operated, phase modulation was produced by physically shock exciting the mirror to cause it to vibrate with a component in the direction shown by arrow 74 in FIG. 5. The readout signal intensity $I_S$ obtained using both the phase modulated reference beam and the object beam for the read operation, was 15.4 times more intense than the signal obtained using only the unmodulated reference beam for readout.

In a practical situation, the choice of which method of modulation is to be employed depends upon a number of factors. In part, it depends upon the ease of modulation, that is, whether in a particular system it is easier physically to introduce an amplitude or phase modulator. It depends also on the phase shift introduced between the image and object wave by the hologram. Consider, for example, the case where the object wave has a phase shift $\phi_1$ with respect to the image wave. Then the total detected amplitude (in the case of amplitude modulation) can be expressed as:

$$A_S = (nI_R)^{1/2} \cos wt + (I_r)/k^{1/2} e^{j\phi_1} \tag{18}$$

The detected intensity is then:

$$I_S = A_S A_S^* = nI_r[1 + \cos 2wt] + (I_r k) + 2I_r (n/k)^{1/2} \cos wt \cos \phi_1 \tag{19}$$

If, for various reasons, $\phi_1 = \pi$, (or $\cos \phi_1 = 0$) there would be no detected enhanced signal.

In the case of a phase modulated reference wave, the total detected amplitude would be:

$$A_S = (nI_r)^{1/2} e^{j\phi_0 \cos wt} + (I_r/k)^{1/2} e^{j\phi_1} \tag{20}$$

$$= \{e^{-j\phi_1} (nI_r)^{1/2} e^{-j\phi_1 -\phi_0 \cos wt} + (I_r/k)^{1/2}\} \tag{21}$$

where $\phi_0$ is the phase modulation and $\phi_1$ is a phase shift due to the hologram. The detected intensity is:

$$I_S = A_S A_S^* = nI_r + (I_r/k) + 2I_r (n/k)^{1/2} \cos(\phi_1 - \phi_0 \cos wt) = nI_r + (I_r/k) + 2I_r (n/k)^{1/2} \{\cos \phi_1 \cos(\phi_0 \cos wt) + \sin \phi_1 \sin(\phi_0 \cos wt)\} \tag{22}$$

Thus, at any phase $\phi_1$, there will be an enhanced detected signal. If $\phi_1 = \pi$, the detected signal is:

$$2I_r (n/k)^{1/2} \sin (\phi_0 \cos wt) \quad (23)$$

if $\phi_1 = 0$ then:

$$2I_r (n/k)^{1/2} \cos (\phi_0 \sin wt) \quad (24)$$

for values $0 < \phi_1 < \pi$ the general result above applies. Thus, in situations where the relative phase between image and object is 90° (e.g., a phase hologram or where due to mechanical vibration the relative phase could attain phase shifts of 90°, phase modulation of the reference wave appears to be the preferred mode of operation.

In the embodiments of the invention discussed above, during readout of a stored hologram two beams are employed, one following the path of the reference beam and the other following the path of the object beam, and only one of the beams is modulated. It is also possible to modulate both beams at different frequencies. This may be accomplished, for example, with the arrangement of FIG. 6 using two disks of different shape (say one with two cutouts and the other with four) and driving them at the same speed, or by using two disks of the same shape and driving them at different speeds, or with the arrangement of FIG. 5 using piezoelectric elements operating at different frequencies. (Other embodiments based on the other FIGS. 4 and 7 also are possible.) The output signal may then be detected at the difference (and/or sum) frequency of the two modulating signals. This modification is shown schematically in FIG. 1 by the block 50a shown in phantom view.

What is claimed is:

1. A method of reading out a hologram formed by the interference of a reference beam and an object beam, comprising the steps of:
   directing two spatially unmodulated beams onto the hologram, one following the path of the reference beam and the other following the path of the object beam;
   temporally modulating one of the beams at a given frequency; and
   detecting at least the given frequency component of the virtual image reconstructed by the two beams.

2. The method as set forth in claim 1 wherein the step of modulating one of the beams comprises amplitude modulating said beam.

3. The method as set forth in claim 1 wherein the step of modulating one of the beams comprises phase modulating said beam.

4. The method as set forth in claim 1 wherein the step of modulating one of the beams comprises intensity modulating said beam.

5. An arrangement for reading out a hologram comprising, in combination:
   means for directng two beams at the hologram, one following the path of the reference beam and the other following the path of the object beam;
   means for modulating one of said beams at a given frequency; and
   means for detecting at least the given frequency component of the image reconstructed by the two beams.

6. An arrangement as set forth in claim 5, further including:
   means for modulating the other of said beams at a frequency different than that employed to modulate said one beam.

* * * * *

UNITED STATES PATENT OFFICE
CERTIFICATE OF CORRECTION

Patent No. 3,767,285     Dated October 23, 1973

Inventor(s) Reuben Saul Mezrich

It is certified that error appears in the above-identified patent and that said Letters Patent are hereby corrected as shown below:

Column 2, line 62, "o" should read --on--. Column 4, line 8, "on" should be deleted. Column 6, line 10, "plate" should read --plane--. Column 7, equation (14), that portion of the right-hand side of the equation reading "cos 2x" should read --cos x--; and equation (17), that portion of the right-hand side of the equation reading "cos(cos 2x)" should read $--\cos(\phi_0 \cos x)--$. Column 8, equation (18), that portion of the right-hand side of the equation reading "$(I_r)/k^{1/2}$" should read $--(I_r/k)^{1/2}--$; equation (19), that portion of the right-hand side of the equation reading "$nI_r$" should read $--nI_r/2--$; equation (20), that portion of the right-hand side of the equation reading "$e^{j\phi_0 \cos wt}$" should read $--e^{j\phi_0 \cos wt}--$; and equation (21), that portion of the right-hand side of the equation reading "$e^{-j\phi_1 -\phi_0 \cos wt}$" should read $--e^{-j\phi_1-\phi_0 \cos wt}--$.

Column 10, line 22, between "hologram" and "com-" should be inserted --formed by the interference of a reference beam and

UNITED STATES PATENT OFFICE
CERTIFICATE OF CORRECTION

Patent No. 3,767,285    Dated October 23, 1973

Inventor(s) Reuben Saul Mazrich

It is certified that error appears in the above-identified patent and that said Letters Patent are hereby corrected as shown below:

an object beam,--; line 24, "beams at" should read --spatially-unmodulated beams onto--; and line 27, between "for" and "modulating" should be inserted --temporally--.

Signed and sealed this 1st day of October 1974.

(SEAL)
Attest:

McCOY M. GIBSON JR.
Attesting Officer

C. MARSHALL DANN
Commissioner of Patents